3,597,440
Patented Aug. 3, 1971

3,597,440
SALTS OF ISOPERTHIOCYANIC ACID
Raymond Seltzer, New York, N.Y., and William J. Considine, Somerset, N.J., assignors to M&T Chemicals Inc., New York, N.Y.
No Drawing. Filed Dec. 18, 1968, Ser. No. 784,916
Int. Cl. C07d 91/04
U.S. Cl. 260—306.8R                  1 Claim

ABSTRACT OF THE DISCLOSURE

This invention relates to salts of isoperthiocyanic acid of the formula

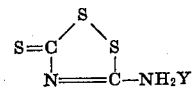

wherein Y is an acid. Such salts may be used in the control of bacteria, fungi, and marine organisms.

---

This invention relates to a novel process for preparing new and valuable derivatives of 3-amino-5-thione 1,2,4-dithiazole and the novel derivatives so prepared.

It is an object of this invention to provide a novel salt of 3-amino-5-thione 1,2,4-dithiazole and a process for preparing said novel salts. Other objects will be apparent to those skilled in the art upon inspection of the following.

This invention relates to salts of isoperthiocyanic acid of the formula

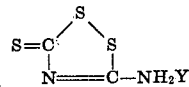

wherein Y is an acid.

According to another of its aspects this invention is a method for producing salts of isoperthiocyanic acid of the formula

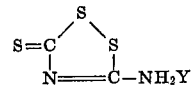

wherein Y is an acid, comprising reacting as reactants isoperthiocyanic acid and an acid and recovering said salt of isoperthiocyanic acid.

The isoperthiocyanic acid used in the practice of this invention is obtainable by the reaction of an ammonium or an alkali metal thiocyanate with a mineral acid.

Among the acids operable in the practice of this invention are sulfuric acid, hydrobromic acid, hydrochloric acid, hydroiodic acid, oxalic acid, acetic acid, anisic acid, arsenic acid, arsenous acid, benzoic acid, boric acid, butyric acid, camphoric acid, capric acid, fluoroboric acid, lactic acid, levulinic acid, lauric acid, maleic acid, malic acid, malonic acid, molybdic acid, nitric acid, perchloric acid, phosphoric acid, phthalic acid, picric acid, propionic acid, pyruvic acid, stearic acid, succinic acid, sulfonic acid, sulfanilic acid, and tartaric acid.

The process of this invention may be represented by the partial equations:

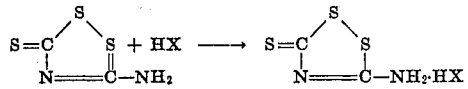

wherein HX is an acid.

In a specific aspect, the process of this invention comprises dissolving isoperthiocyanic acid in a suitable solvent, reacting said isoperthiocyanic acid with a gaseous or liquid acid, thereby precipitating a salt of said acid and recovering said isoperthiocyanic acid.

In the practice of this invention the molar ratio of isoperthiocyanic acid in solution to an acid compound should be maintained at about 1:1 for the synthesis of the salt of isoperthiocyanic acid. The relative proportion of the two reactants, isoperthiocyanic and a salt forming acid, may be used in any ratio such that there is an excess of the salt forming acid compared to the stoichiometric ratio of 1:1. For the practice of the product of this invention it is also advantageous to prepare the isoperthiocyanic acid in situ just prior to the reaction of the acetic compound to form the salts of this invention.

In the practice of the process of this invention, the reaction between isoperthiocyanic acid and a salt forming acid is conveniently conducted in the presence of an organic solvent reaction medium capable of at least partially dissolving the reactants. The nature of the solvent is not critical, thus any suitable inert organic solvent may be used. Typical solvents include: alkanols, such as methanol and ethanol; ketones such as acetone and methyl ethyl ketone; and ethers such as dioxane and tetrahydrofuran. The amount of the reaction medium used is preferably sufficient to maintain the reaction mixture in a liquid medium.

The process may be carried out at ambient temperature, although the process is operable over a wide temperature range. Generally, there is no advantage of carrying out the reaction at a temperature reaction below 0° C. or above 100° C. A suitable temperature range may be 15° C. to 50° C.

Salts of isoperthiocyanic acid are active in the control of a wide variety of pestiferous organisms, particularly bacteria, fungi, and marine organisms, e.g. as the active component in antifouling paints. The salts of this invention are particularly adapted to inhibiting microbiological deterioration of organotin substances particularly susceptible to deterioration by the action of microorganisms. The salts of isoperthiocyanic acid are also active in inhibiting the formation of slime in aqueous fluids.

Further to illustrate the invention the following examples are described hereinbelow, which are understood to be illustrative and not restrictive embodiments of the invention.

EXAMPLE 1

The preparation of hydrogen chloride salts of isoperthiocyanic acid 20.0 grams (0.0133 mole) of isoperthiocyanic acid was dissolved in two liters of acetonitrile, refluxed for two hours, and cooled to room temperature. The resulting solution of isoperthiocyanic acid was filtered to remove that isoperthiocyanic acid which remained undissolved. Hydrogen chloride gas was bubbled through the clear solution for 40 minutes. The hydrogen chloride salt of isoperthiocyanic acid precipitated from the solution. The product was filtered from said solution, washed with acetonitrile, and dried. The product exhibited a yield of 3.0 grams (a yield of 46%) and a melting point range of 190° C.

Elemental analysis for $C_2H_3ClN_2S_3$.—Calculated (percent): Cl, 18.99; N, 15.01; S, 51.50. Found (percent): Cl, 18.39; N, 15.15; S, 50.95.

EXAMPLE 2

2.0 grams (0.0133 mole) of isoperthiocyanic acid was dissolved in 250 milliliters of dioxane. The resulting solution was filtered to remove isoperthiocyanic acid. Hydrogen chloride gas was bubbled through the resulting clear filtrate. The product, the hydrogen chloride salt of isoperthiocyanic acid, a yellow solid, precipitated. The product exhibited a weight of 0.5 gram. The identification product was confirmed by infra-red analysis.

Although this invention has been illustrated by reference to specific examples, numerous changes and modifications thereof which clearly fall within the scope of the invention will be apparent to those skilled in the art.

We claim:
1. Salts of isoperthiocyanic acid of the formula

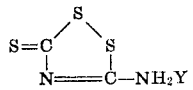

wherein Y is an acid selected from the group consisting of hydrogen chloride, hydrogen bromide and hydrogen iodide.

References Cited

Allen et al., J. Am. Chem. Soc., 76 (1954), 1158–9.

Cason, Essential Principles of Organic Chemistry, Prentice-Hall, 1956, 231–2.

ALEX MAZEL, Primary Examiner

R. J. GALLAGHER, Assistant Examiner

U.S. Cl. X.R.

106—15; 260—299, 300, 999